UNITED STATES PATENT OFFICE.

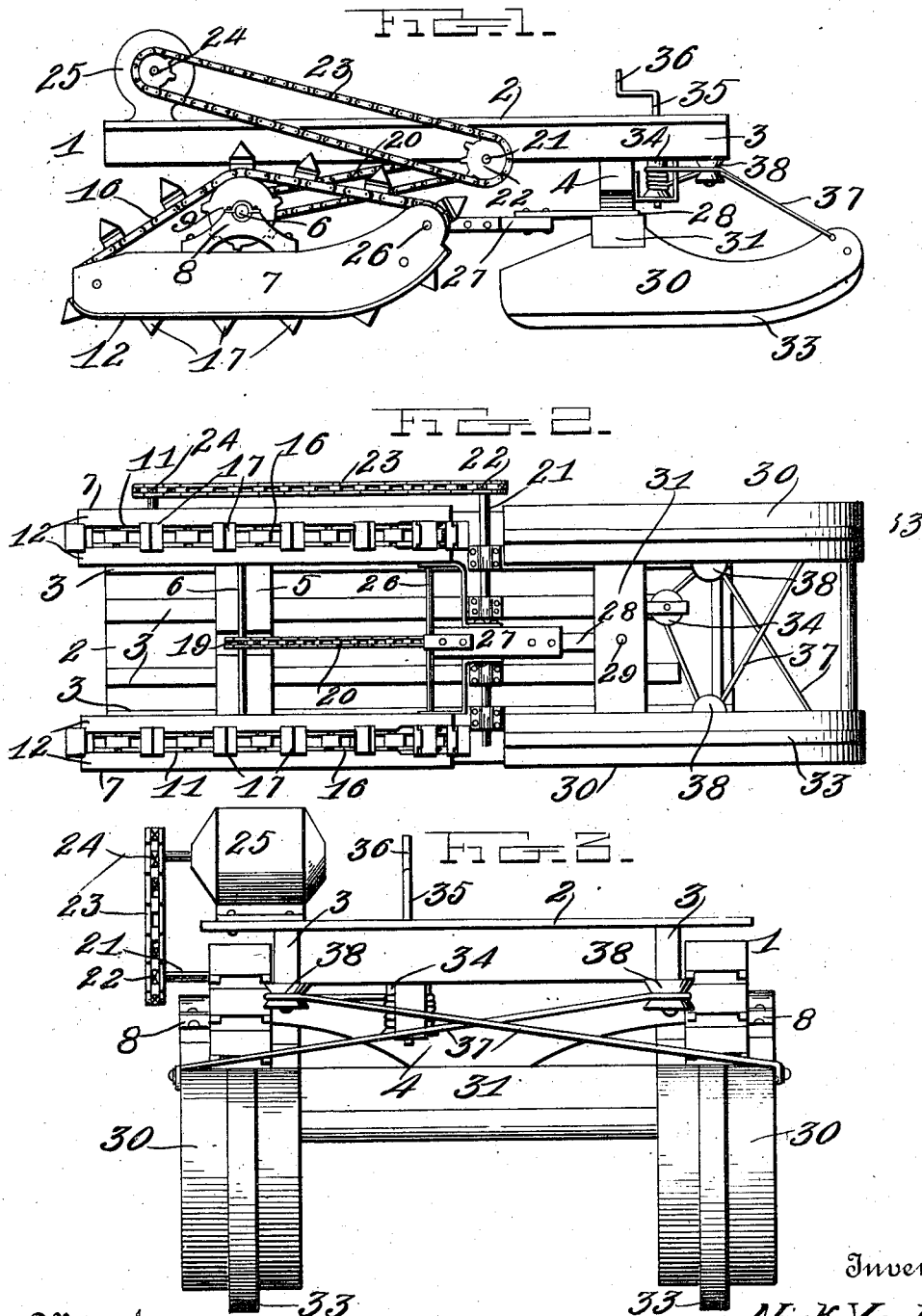

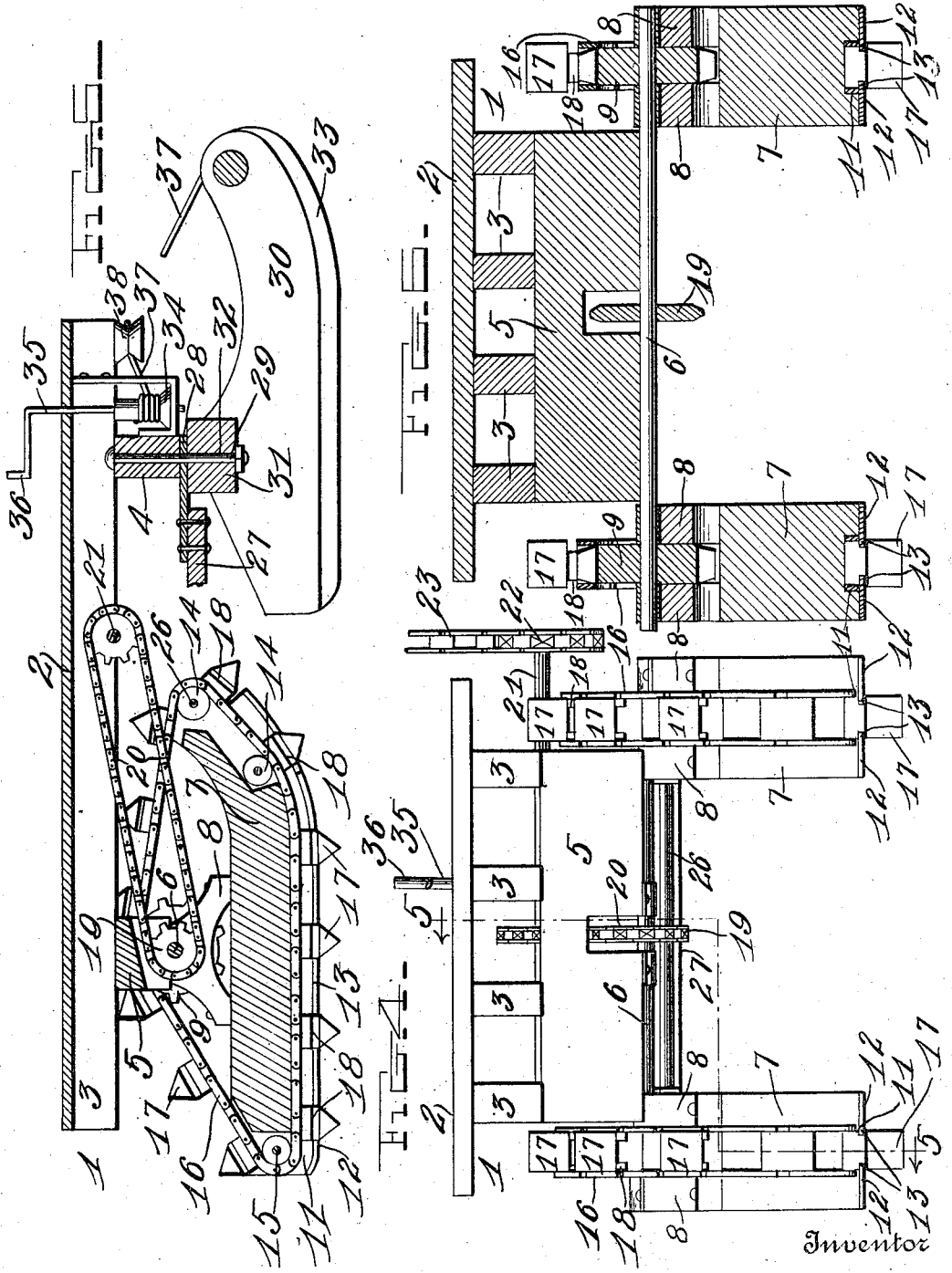

NICK YACH, OF POLONIA, WISCONSIN.

SELF-PROPELLED SLED.

1,001,113.

Specification of Letters Patent. Patented Aug. 22, 1911.

Application filed December 23, 1910. Serial No. 598,927.

*To all whom it may concern:*

Be it known that I, NICK YACH, a citizen of the United States, residing at Polonia, in the county of Portage and State of Wisconsin, have invented certain new and useful Improvements in Self-Propelled Sleds; and I do declare the following to be a full, clear, and exact description of the invention, such as will enable others skilled in the art to which it appertains to make and use the same.

This invention relates to improvements in self propelled sleds.

One object of the invention is to provide a sled having thereon an improved construction and arrangement of propeller mechanism whereby the sled may be rapidly driven over snow or ice.

Another object is to provide an improved construction and arrangement of steering mechanism whereby the sled may be readily controlled.

With the foregoing and other objects in view, the invention consists of certain novel features of construction, combination and arrangement of parts as will be more fully described and particularly pointed out in the appended claim.

In the accompanying drawings: Figure 1 is a side view of a sled showing the application of my improved propelling mechanism; Fig. 2 is a bottom plan view thereof; Fig. 3 is a front end view; Fig. 4 is a rear end view; Fig. 5 is an irregular vertical longitudinal section on the line 5—5 of Fig. 4; Fig. 6 is a vertical cross section through the rear runners and the operating mechanism for the propellers.

Referring more particularly to the drawings, 1 denotes the body portion of my improved sled, said body portion comprising a platform 2, longitudinally disposed sills 3, a front bolster 4 and a rear bolster 5. Journaled in suitable bearings on the under side of the rear bolster 5 is a rear runner supporting and propelling shaft 6.

To the outer ends of the shaft 6 are pivotally connected rear runners 7, said runners having on their upper sides pairs of bearing blocks 8 with which the outer ends of the shaft 6 are engaged. On the outer ends of the shaft between the bearing blocks 8 are fixedly mounted sprocket wheels 9 the operation of which will be hereinafter more fully described. On the lower sides of the runners are formed longitudinally extending guide grooves or channels 11 and to the lower sides of the runners on the opposite sides of the channels 11 are secured metal shoes or wear plates 12 the inner edges of which project inwardly beyond the side walls of the channels and form longitudinal flanges 13.

In the front ends of the runners 7 are formed recesses in which are revolubly mounted pairs of guide rollers 14 while in the rear ends of the runners are formed recesses in which are revolubly mounted guide rollers 15. Around the rollers 14 and 15 and through the channels 11 are arranged endless sprocket chains 16 the upper stretches of which pass over and are engaged by the sprocket gears 9 whereby said chains are driven. To the chains 16 and spaced at suitable distances apart are teeth or shaft propelling lugs 17, said lugs being suitably secured to the links of the chains and having in their opposite sides transverse grooves or notches 18 with which when the lugs pass through the channels 11 are engaged the flanges 13 of the shoes 12 whereby the lugs are guided and held in position while engaging the snow or ice over which the sled is being driven.

On the shaft 6 preferably midway between its ends is fixedly mounted a sprocket gear 19 which is connected by a sprocket chain 20 to a drive shaft 21 revolubly mounted in suitable bearings in the sills of the platform. The shaft 21 is driven in any suitable manner and is here shown as being provided on one end with a sprocket gear 22 which is connected by a sprocket chain 23 with a sprocket gear 24 on the shaft of a suitable motor 25 arranged on the sled whereby the propelling devices of the runners may be operated.

The front ends of the rear runners are connected together by a cross bar 26 to which is loosely connected the rear end of a reach bar 27 the forward end of which is connected by an attaching plate 28 to a king bolt or pin 29 by means of which the front runners 30 are pivotally connected to the front bolster 4 of the sled. The runners 30 are connected together by a cross bar 31 in which is formed a centrally disposed hole or passage 32 with which the king pin or bolt 29 is engaged. The front runners 30 are preferably provided on their lower edges with centrally disposed shoes or runner bars 33.

In order to control the movement of the sled I provide a suitable steering mechanism comprising a cable winding drum 34 which is fixedly mounted on the lower end of a steering shaft 35 which is revolubly mounted in suitable bearings on the front end of the sled and projects up through the platform thereof as shown. The shaft 35 has arranged on its upper end a crank arm 36 whereby the shaft and drum may be readily turned in one direction or the other.

Connected to the drum 34 and adapted to be wound on and off the same in opposite directions are steering cables 37 which pass from the drum 34 around guide pulleys 38 and from thence are crossed and extended to the opposite outer ends of the runners to which the ends of the cables are firmly secured in any suitable manner. By thus arranging the cables 37 the front runners may be turned in the desired direction by winding up one or the other of the cables on the drum which operation will unwind the other cable thereby steering the sled.

From the foregoing description taken in connection with the accompanying drawings the construction and operation of the invention will be readily understood without requiring a more extended explanation.

Having thus described my invention, what I claim is:

In a self propelled sled comprising a platform, a driven shaft, rear runners having bearing blocks thereon to pivotally connect the ends of the shaft to the runners, sprocket wheels on the opposite ends of the shaft, a sprocket wheel also on the central portion of the shaft, the rear runners having longitudinally extended channels on the lower sides thereof, the opposite sides of the channels being provided with wear plates the inner edges of which project inwardly beyond the side walls of the channels so as to provide longitudinal flanges, guide rollers on the front and rear ends of the rear runners, sprocket chains mounted on said rollers and said sprocket wheels and operating through said channels, teeth secured to the links of the chains and depending from the same, said teeth having grooves in their opposite sides which are adapted to contact with said longitudinal flanges of said wear plates when the chains are operated, and a drive shaft having a central gear provided with a sprocket chain thereon and on the gear of the shaft of the rear runners.

In testimony whereof I have hereunto set my hand in presence of two subscribing witnesses.

NICK YACH.

Witnesses:
F. A. NEUBERGER,
M. W. RICE.

Copies of this patent may be obtained for five cents each, by addressing the "Commissioner of Patents, Washington, D. C."